(12) United States Patent
Leister et al.

(10) Patent No.: US 8,218,222 B2
(45) Date of Patent: Jul. 10, 2012

(54) CONTROLLABLE LIGHT MODULATOR

(75) Inventors: Norbert Leister, Dresden (DE); Ralf Haussler, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 203 days.

(21) Appl. No.: 12/809,084

(22) PCT Filed: Dec. 15, 2008

(86) PCT No.: PCT/EP2008/067479
§ 371 (c)(1),
(2), (4) Date: Jun. 18, 2010

(87) PCT Pub. No.: WO2009/080576
PCT Pub. Date: Jul. 2, 2009

(65) Prior Publication Data
US 2010/0265558 A1    Oct. 21, 2010

(30) Foreign Application Priority Data
Dec. 20, 2007 (DE) .......................... 10 2007 063 382

(51) Int. Cl.
*G02F 1/1335* (2006.01)
*G02B 5/122* (2006.01)
(52) U.S. Cl. ........................................ 359/246; 359/529
(58) Field of Classification Search .................. 359/246, 359/239, 302, 524, 529, 530, 727, 730; 349/63, 349/67, 113
See application file for complete search history.

(56) References Cited

U.S. PATENT DOCUMENTS
6,819,507 B2 * 11/2004 Minoura et al. ............... 359/727
6,844,956 B2 *  1/2005 Minoura et al. ............... 359/263
2002/0154408 A1 10/2002 Minoura et al.

FOREIGN PATENT DOCUMENTS
JP         05-119341         5/1993

OTHER PUBLICATIONS
International Search Report, dated May 8, 2009, and Written Opinion, issued in priority International Application No. PCT/EP2008/067479.

* cited by examiner

*Primary Examiner* — Ricky Mack
*Assistant Examiner* — Tuyen Tra
(74) *Attorney, Agent, or Firm* — Saul Ewing LLP

(57) ABSTRACT

An individual, controllable light modulator is configured with a regular pixel structure, for realizing different types of modulation. The spatial light modulator can be realized transmissively and reflectively. The light modulator contains at least one addressable, transmissive layer with a pixel structure and at least one substrate layer with retro-reflecting elements, as well as modulation control means for controlling the modulation of the pixels. The modulation control means produce a number of macropixels from at least two adjacent pixels, to which a selected modulation characteristic is assigned. The retro-reflecting elements are disposed consecutively in such a manner in the substrate layer that, in each case, a retro-reflecting element covers two adjacent pixels of a macropixel of the addressable layer, in order to direct a light bundle, incident in each case on one pixel of a macropixel, sequentially, through further pixels of the macropixel to modulate the incident light bundle.

18 Claims, 3 Drawing Sheets

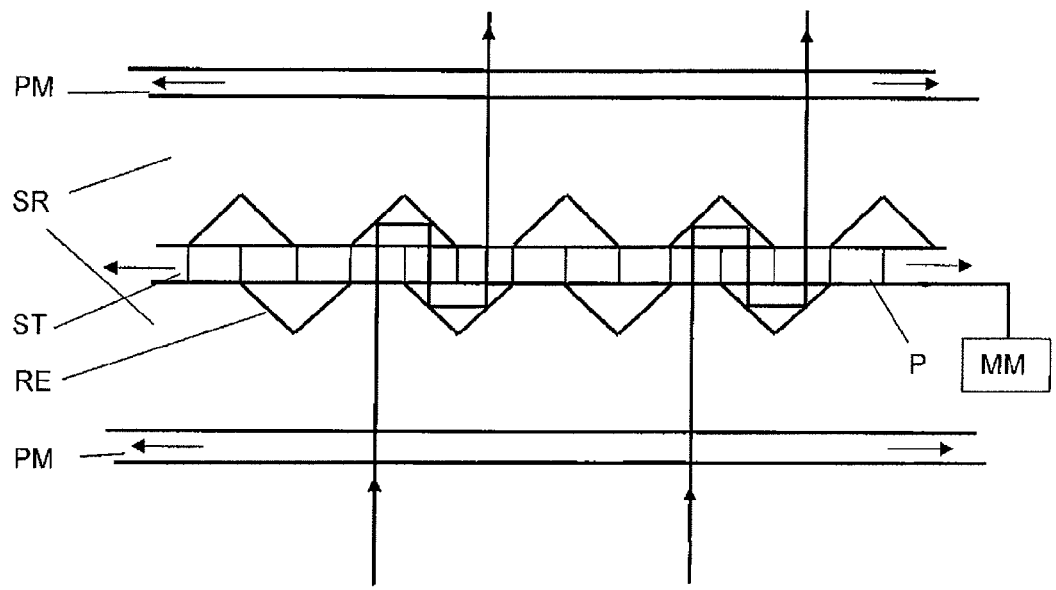
Fig. 2a
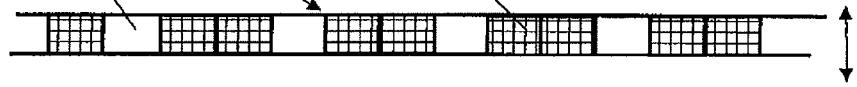

CONTROLLABLE LIGHT MODULATOR

CROSS REFERENCE TO RELATED APPLICATIONS

This application claims the priority of PCT/EP2008/067479, filed on Dec. 15, 2008, which claims priority to German Application No. 10 2007 063 382.5, filed Dec. 20, 2007, the entire contents of which are hereby incorporated in total by reference.

BACKGROUND OF THE INVENTION

The present invention relates to a controllable light modulator which comprises at least one substrate layer with retro-reflecting elements and an addressable transmissive layer with a regular pixel structure, where at least two adjacent pixels of the pixel structure form a macro-pixel, where the spatial light modulation is controlled by a system controller.

The fields of application of spatial light modulators (SLM) are manifold and include display and projection systems for the consumer goods sector, microscopy (optical tweezers, phase filters) beam and wave front forming, optical measuring equipment (digital holography, optical sensor), and applications in maskless lithography, ultra-fast laser pulse modulation (dispersion compensation) or in terrestrial telescopes (dynamic aberration correction).

A high-quality display of images is imperative in many of those applications, e.g. for the three-dimensional representation of moving scenes in holographic displays. The values of a computed hologram of a 3D scene which are to be used to reconstruct that scene, or values of other applications which are to be written to the pixelated light modulator are typically provided in the form of a matrix of complex values. A complex value which serves to modulate both the phase and amplitude of a wave front cannot be displayed directly in a single pixel of a conventional SLM until today. However, the modulation of only one value per pixel, i.e. a phase-only or an amplitude-only modulation, only results in an insufficient holographic reconstruction of a moving 3D scene, both as regards the quantity and quality. A complete representation of the complex values can only be achieved by a complex-valued modulation if possible at the same location and at the same point of time on an SLM.

Depending on the actual type of SLM, various methods are known to achieve a simultaneous modulation of both parts of the complex values to be displayed.

For example, two separately controllable SLM can be combined and arranged very close to each other in order to simultaneously modulate both the amplitude and phase of coherent light. One SLM modulates the amplitude, the other one the phase of the incident light. Further combinations of modulation characteristics are also possible with such arrangement.

The light must first pass through one pixel of the one SLM and then through the corresponding pixel of the second SLM. This can be achieved for example in that The first SLM is imaged onto the second SLM by a large-area optical element, e.g. a lens, or The first SLM is imaged onto the second SLM by an array of small-sized lenses, or The two SLMs are sandwiched together.

These combinations of two SLMs which serve to achieve a complex-valued modulation have the disadvantage that the distance between the two SLMs is much larger than their pixel pitch, i.e. the distance between two pixels.

A typical pixel pitch of a SLM for holographic applications is between 10 µm and 50 µm. In contrast, the distance between the two SLM panels in a sandwich arrangement is several 100 µm, in arrangements where one SLM panel is imaged onto the other, their distance is even larger.

Many types of light modulators, such as liquid crystal (LC) SLMs typically have an addressable layer of liquid crystals which is embedded between transparent glass substrates. Alternatively, in a reflective display, the addressable layer is disposed between a transparent glass substrate and a reflective glass substrate.

The glass substrates typically have a thickness of between 500 µm and 700 µm.

A sandwich structure for a complex-valued modulation can be created in that a single phase-modulating SLM and a single amplitude-modulating SLM are arranged with their glass substrates one after another. When a pencil of rays which comes from the addressable layer of a pixel of the phase-modulating SLM falls on the addressable layer of a pixel of the amplitude-modulating SLM after the passage through the glass substrates, it would already be broadened at the aperture of this pixel by diffraction effects so that cross-talking of pencils of rays of adjacent pixels would occur.

When using imaging elements, there is the challenge that exactly one pixel of the first SLM must be imaged onto one pixel of the second SLM across the entire surface of the SLMs. This requires optical systems which exhibit extremely little distortion. Such requirements can hardly be fulfilled in practice. This is why cross-talking between adjacent pixels also takes place when an imaging technique is employed.

Cross-talking can be even worse if the two SLM panels, the optical imaging system or the light sources are not perfectly aligned in relation to each other.

Further, if SLM panels are combined and disposed very close to each other, such arrangements are susceptible to errors when pencils of rays are incident at an oblique angle. These pencils of rays can run from one pixel of the first SLM panel to a different, non-corresponding pixel of the second SLM panel. This cross-talking deteriorates e.g. the reconstruction quality of a holographic display because this corresponds with a wrong combination of amplitude and phase values when representing complex values by the SLMs.

In addition to the representation of complex values there are other applications where a single SLM or a single pixel of an SLM is insufficient to achieve a high-quality light modulation. Such an application is the improvement of the contrast of an amplitude-modulating SLM. An SLM pixel which does not modulate the amplitude with great perfection still transmits a certain amount of light even in the condition where the pixel is meant to be black. In contrast, the quality of the light modulation can still be improved with a sandwich-type SLM, which theoretically does not exhibit cross-talking. With the sandwich-type SLM and a combination of two SLM pixels, both functioning as amplitude-modulating pixels, almost the maximum possible brightness can be achieved if both pixels are controlled in the "white" condition. In the "black" controlled condition, the extinction is improved if the SLM pixels which serve as amplitude pixels are combined. Generally, a sandwich-type SLM therefore allows the contrast to be improved; but in practice the problem of cross-talking between pixels persists.

Another application of a sandwich-type SLM is to increase the phase modulation range: If a single SLM only allows for example a phase modulation in a range of between 0 and π, a sandwich of two equally designed phase-modulating SLMs would make it possible to extend the modulation range to 0 to 2π. Another application where sandwich-type SLMs are necessarily be used concerns the increase in the number of amplitude or phase steps. If there is for example a single phase-modulating SLM with only two displayable phase steps, 0 and π, and a second SLM which is also of a binary type but has the phase steps 0 and π/2, a sandwich of these two SLMs would make it possible to represent four phase steps, namely 0, π/2, π, 3π/2.

Further, a sandwich of more than two SLMs could make sense to increase the number of phase steps.

In the above-mentioned applications of the complex-valued SLM and sandwich-type SLM, the problem of cross-talking between the pixels persists.

SUMMARY OF THE INVENTION

It is therefore the object of the present invention to design a single spatial light modulator with regularly arranged pixels such that it allows different types of modulation to be performed, thereby circumventing the disadvantages of prior art modulation devices. It shall be possible to provide both transmission-type and reflection-type spatial light modulator.

The solution is based on a controllable light modulator which comprises at least one addressable transmissive layer and at least one substrate layer, where the addressable transmissive layer has pixels which are regularly arranged in modulator columns and/or modulator rows, and where the substrate layer has retro-reflective elements with reflective surfaces for guiding light of incident pencils of rays, and where a system controller with modulation control means controls the modulation of the pixels.

In this light modulator, the object is solved according to this invention in that The modulation control means generate a number of macro-pixels of at least two pixels which are arranged next to each other in a modulator row and/or modulator column and which are assigned by the system controller with a selected modulation characteristic, and The retro-reflective elements are arranged side by side in the substrate layer in a plane which is parallel to the plane of the light modulator such that each retro-reflective element covers two adjacent pixels of a macro-pixel in a modulator row or modulator column of the addressable layer in order to direct a pencil of rays which falls on one pixel of a macro-pixel after reflection from at least one retro-reflective element sequentially through at least one further pixel of the macro-pixel in order to modulate the incident pencils of rays.

The present invention is thus based on the idea that at least two adjacent pixels of a single pixel structure in an SLM are controlled as macro-pixels, and that a pencil of rays sequentially passes through all pixels of the macro-pixel, where the spatial modulation of the pencils of rays in the pixels is controlled by modulation control means.

In macro-pixels which are known from the prior art, in contrast, the pixels are combined to form one unit, but each pixel is passed by a different pencil of rays.

The controllable light modulator is generally designed such that on either side of the addressable layer there is a substrate layer with retro-reflective elements which are disposed such that transparent regions are created between the retro-reflective elements in at least one substrate layer and that the reflective surfaces of opposing retro-reflective elements face the pixels of the addressable transmissive layer and are arranged at a lateral offset to each other. The width of the lateral offset is preferably one pixel.

A light modulator with these basic components can be supplemented with further optical components, or the existing components can be arranged in a different way such that either a transmissive or a reflective light modulator is created.

Generally, the number of pixels in a macro-pixel is not limited. It may be even or odd, depending on the requirements of the modulation characteristic to be realised.

In one embodiment of the present invention, the light modulator can be transmissive. This is achieved in that the light is guided through a macro-pixel with an odd number of pixels and through at least two retro-reflective elements, where the transparent regions in one substrate layer represent the entry surfaces for the pencils of rays, and where the other substrate layer also has transparent regions which represent the exit surfaces for the pencils of rays.

In a further embodiment of the present invention, the light modulator can be reflective. This is achieved in that the light is guided through a macro-pixel with an even number of pixels and over at least three retro-reflective elements, where the transparent regions in one substrate layer represent the entry surfaces of the pencils of rays, and where other transparent regions in the same substrate layer represent the exit surfaces of the pencils of rays.

Further, in a reflective light modulator, there is a structured polarising means on either side which polarises the pencils of rays differently in the transparent regions of the entry surfaces and in the transparent regions of the exit surfaces.

In a further embodiment of the controllable transmissive light modulator, a polarising means is disposed on at least one side. Inside the light modulator, however, a polarising means can be provided either on the addressable layer or on the substrate layer.

Further, optical imaging means are provided in the transparent regions on the side of light incidence which demagnify and image the incident pencils of rays onto the entry surfaces of the macro-pixels.

In contrast, on the side of light exit, optical imaging means are provided in the transparent regions which broaden the pencils of rays which have passed through the macro-pixels.

A particularly simple embodiment of a reflective light modulator can be realised with a single addressable transmissive layer which is followed in the direction of light propagation by a single substrate layer. The retro-reflective elements are arranged vertically without spacing in the substrate layer in a plane which is in parallel with the plane of the light modulator. The modulation is characterised in that the pencils of rays which fall on a retro-reflective element pass through the macro-pixel which comprises two adjacent pixels and leave the macro-pixel with a lateral offset in relation to the direction of incidence. Thanks to the retro-reflective element it is achieved that the pencil of rays only passes through the pixels of one macro-pixel and not through other pixels independent of the position and angle of light incidence on the pixel, i.e. also if light falls on the SLM at an oblique angle, thus preventing disturbing cross-talking between neighbouring pixels.

The demands made on the adjustment of light sources can with this light modulator preferably be minimised when manufacturing a holographic display. Another advantage is that a thus designed SLM can be employed in a holographic display with light source tracking feature.

In a further embodiment of this simple light modulator, a structured polarising means is provided before the transmissive substrate layer, seen in the direction of light propagation, which assigns adjacent pixels in a modulator row with different polarisations, and adjacent pixels in a modulator column with an identical polarisation for phase and amplitude modulation. A pencil of rays which passes through the macro-pixel, which here comprises two adjacent pixels of one modulator row is thus polarised differently before entry into and after exit out of the pixels.

Further, in this embodiment, the path lengths covered by the incident pencils of rays within the macro-pixel are about in the magnitude of the pixel pitch of the light modulator. Diffraction effects thus only occur on a very small scale, so that they can be widely neglected.

A light modulator which is designed according to this invention can be used to perform a complex-valued modulation of a pencil of rays in each macro-pixel, i.e. a modulation of both amplitude and phase.

To achieve a combined amplitude and phase modulation of the pencils of rays in a macro-pixel of three pixels, it is possible for example that two pixels are controlled such to perform a phase modulation while one pixel is controlled such to perform an amplitude modulation. However, this requires a structured polarising means for changing the direction of polarisation of the guided pencils of rays to be disposed on the exit surface of a phase-modulating pixel of a macro-pixel. The pencils of rays are thus preferably given a total of an independent modulation of amplitude and phase during the passage through the individual pixels of the macro-pixel, thanks to the combination of their different modulation characteristics.

If several pixels of the macro-pixel exhibit an identical modulation characteristic, for example a coupled modulation of amplitude and phase, these single pixels can be controlled independent of each other. Thanks to an accordingly chosen control of the individual pixels, the pencils of rays are also given a total of an independent modulation of amplitude and phase during their passage through the macro-pixels.

A wave front diffracting structure of a spatial scene is preferably written to the controllable light modulator, where said structure serves to modulate the incident pencils of rays so to create a holographic reconstruction. Such a light modulator can be used in a holographic display.

In further embodiments of this invention, the macro-pixels can preferably be used for further purposes. In one embodiment, for example, the number of representable quantisation steps for the modulation increases as the number of pixels in the macro-pixel becomes larger.

In another embodiment, the representable range of values for phase modulation is increased through the modulation in the macro-pixels. This is the case if the modulation characteristic for all pixels is that of a phase modulation, which can then be the same for all pixels of the macro-pixel.

Moreover, different embodiments can be combined.

For example, in one macro-pixel, several pixels can carry out an amplitude modulation to improve the contrast, and several other pixels can carry out a phase modulation to increase the range of values for phase modulation, where all amplitude and phase pixels together realise a complex-valued modulation.

BRIEF DESCRIPTION OF THE DRAWINGS

Now, the light modulator device according to this invention will be described in detail in conjunction with the accompanying drawings, which are sectional views, wherein FIG. 2a is a schematic top view of a detail of a second embodiment of a light modulator, FIG. 2b is a schematic front view of a detail of a row of the light modulator of FIG. 2a, FIG. 2c is a schematic rear view of a detail of a row of the light modulator of FIG. 2a, FIG. 3 is a schematic top view of a detail of a further embodiment of a light modulator device according to this invention.

DETAILED DESCRIPTION

The controllable light modulator according to this invention comprises as basic components at least one addressable transmissive layer in which pixels are arranged regularly in modulator rows and/or modulator columns, and at least one substrate layer with retro-reflective elements. The light modulator is illuminated with pencils of rays of sufficiently coherent light which is emitted by a light source means. Lasers or LEDs whose light is spatially and/or spectrally filtered can serve as light source means.

The modulation of the pixels is controlled by modulation control means which are part of the system controller.

These basic components are shown schematically in the detailed views in the FIGS. 1 to 5, which illustrate different embodiments and physical forms. The paths of the incident and exiting pencils of rays are indicated by arrows.

Figure 1:
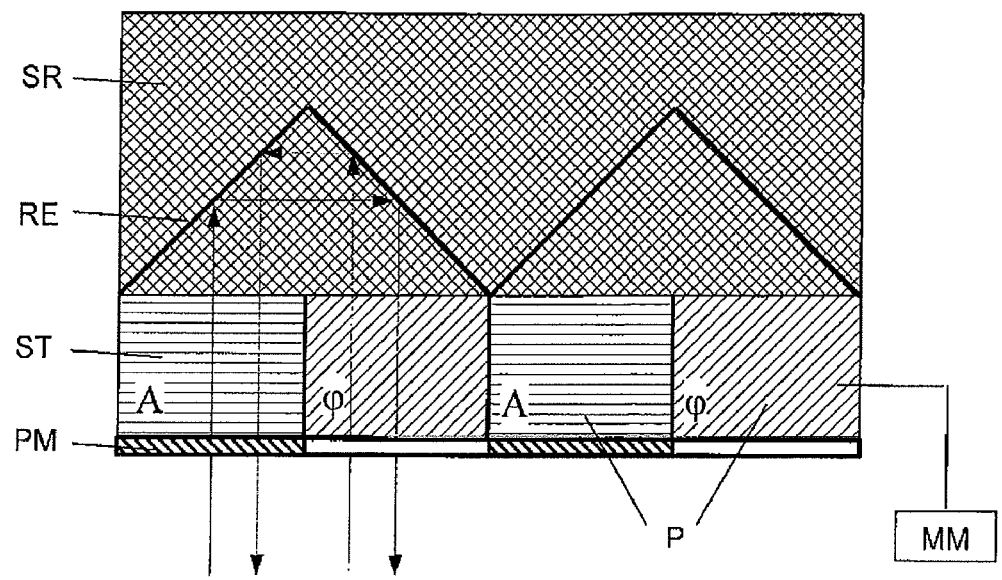
FIG. 1 is a schematic top view of a detail of a first embodiment of a light modulator.

FIG. 1 shows a first embodiment, which represents the most simple embodiment of a reflective light modulator. This top view shows a single transmissive substrate layer SR with retro-reflective elements RE, and a single addressable transmissive layer ST with pixels P of a regular pixel structure in a modulator row.

The light modulator can additionally comprise a second transparent substrate layer SR disposed before the addressable layer ST. The addressable transmissive layer ST can be a liquid crystal layer, the same goes for the substrate layer SR.

Other modulator types are possible as well, e.g. modulators based on electrowetting cells or magneto-optical layers.

Two adjacent pixels P which lie side by side horizontally, i.e. in one dimension, form a macro-pixel. A macro-pixel is generated by a modulation control means MM, where the number of individual pixels P per macro-pixel is defined according to the actual application.

Referring to FIG. 1, in a macro-pixel, the phase $\phi$ and amplitude A (or vice versa) of an incident pencil of rays is modulated separately by the two pixels P. The light path of the incident pencils of rays is deflected by the retro-reflective element RE by way of reflection. One column of the light modulator comprises only phase pixels or only amplitude pixels.

A retro-reflective element RE in the substrate layer SR has two reflective surfaces which are in parallel in the vertical direction. The reflective surfaces are arranged without gap under a given angle such that they form a prism with the substrate layer SR and such that they reflect an incident pencil of rays. The given angle is preferably 90° here. Adjacent retro-reflective elements RE are disposed in the substrate layer SR without gaps. The pixels P and the retro-reflective elements RE are mutually arranged and dimensioned such that one retro-reflective element RE covers exactly the width of one macro-pixel.

Depending on the type of addressable layer, in particular in conjunction with a light modulator whose addressable layer is a liquid crystal layer, the SLM additionally comprises polarising means PM. If the modulator is based e.g. on electrowetting cells, these polarising means may not be necessary.

The side of the SLM which faces a light source means (not shown) comprises a polarising means PM. Depending on the modulation characteristic of the individual pixels, this can be an unstructured polarising means in the most simple case.

However, a polarising means which is structured in columns is preferably used. A pencil of rays which falls on the left-hand side pixel of a macro-pixel is then polarised differently than the light which falls on the right-hand side pixel of a macro-pixel.

In addition, another—possibly structured—polarisation means can be disposed on the inside of the substrate layer, where said polarising means includes the retro-reflective element RE. This is to achieve that a pencil of rays first passes a pixel P of the macro-pixel, then the polarising means PM and the retro-reflective element RE, and finally the second pixel P of the macro-pixel for modulation.

In another physical form, the retro-reflective elements RE can also be arranged turned by 90° in the SLM, so that they cover two pixels P which lie one above the other in a modulator column.

Figure 4:
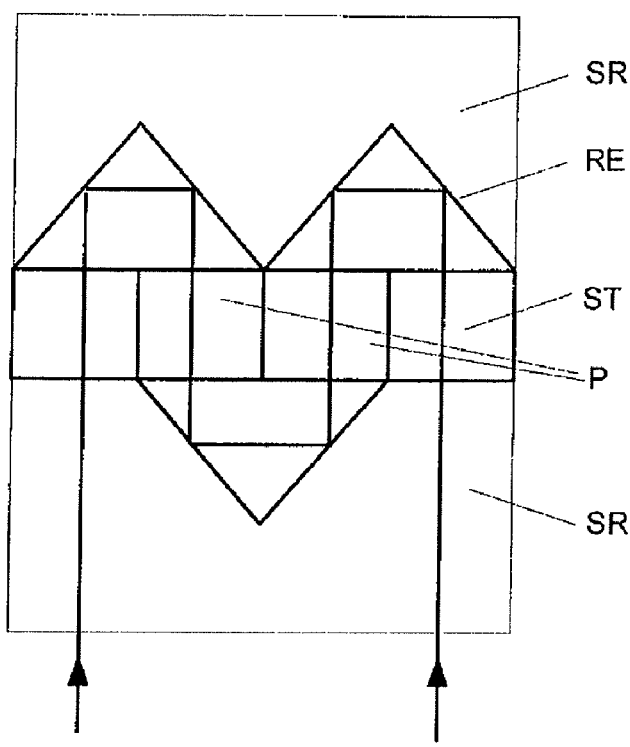
FIG. 4 is another physical form of the first embodiment.

In the general embodiment of a reflective light modulator, a one-dimensional macro-pixel comprises an even number of pixels. FIG. 4 shows an example with four pixels which lie side by side horizontally in a row, but the pixels can alternatively also be arranged one above another vertically.

In the general case, the retro-reflective elements RE are accordingly arranged horizontally or vertically. Moreover, a mixed horizontal and vertical arrangement, as illustrated in the detail in FIG. 5, can serve to realise a modulation. In such an arrangement, two horizontally and two vertically adjacent pixels P, i.e. altogether four pixels, represent a two-dimensional macro-pixel. In applications which use coherent light, it can be preferred if the entire macro-pixel has a square shape, because it then exhibits the same diffraction angle both in the horizontal and in the vertical dimension. Depending on the type of SLM, a second substrate layer may be provided, which is transmissive e.g. in an LC-type SLM.

The retro-reflective elements RE can for example be manufactured in the substrate layer SR in that first the surface of a plane, transmissive substrate is treated e.g. in an etching process such that cavities are created in the substrate which show a certain desired angle. These cavities can then be coated with a metal layer so to get a reflecting surface. Thereafter, the cavities can be filled again with a transmissive material, e.g. a resin, and the surface of the entire element can thus be levelled again. Further process steps, e.g. the deposition of electrodes and orientation structures on the substrate layer, correspond with the manufacturing process of a conventional SLM panel. All pixels P have the same design if this production process is employed.

However, this is only one possible manufacturing method. The invention shall not be limited to this method though.

FIG. 2a is a top view that shows a second embodiment of an SLM. The individual components which are known from FIG. 1 are used in such combination and arrangement that they realise a transmissive SLM.

For this, a transmissive substrate layer SR with integrated retro-reflective elements RE is disposed on either side of the transmissive addressable layer ST which accommodates the pixel structure with the pixels P. In contrast to the first embodiment, adjacent retro-reflective elements RE in the substrate layers SR are arranged at a distance which corresponds with the width of a pixel P so that transparent regions are formed. The transparent regions in the one substrate layer SR which face the light source means represent the entry surfaces for the pencils of rays. Accordingly, the transparent regions in the other substrate layer represent the exit surfaces. The retro-reflective elements RE in the one substrate layer SR are positioned in relation to the retro-reflective elements RE in the other substrate layer SR such that both lie in opposition with an offset of the width of one pixel P, and such that their reflective surfaces face each other. In the transmissive SLM, the modulation control means MM generates a macro-pixel such that it comprises an odd number of pixels greater than 1. Referring to FIG. 2a, three adjacent pixels P in a modulator row form a macro-pixel. In several types of SLM, for example in liquid-crystal-type SLM, polarisation means PM can be disposed both on the side of light incidence and on the side of light exit.

Depending on the modulation characteristic of the individual pixels, these can be unstructured polarising means PM which are disposed on the outside of one or both substrates in the most simple case. They are arranged such that a pencil of rays is polarised once when it enters the SLM and once when it leaves the SLM. In addition, structured polarising means PM can be disposed on the respective insides of the substrates between the addressable layer and the retro-reflective element. They serve to modify the polarisation of the pencils of rays after they have passed through one pixel of the macro-pixel and before they pass through the next pixel of the macro-pixel.

The paths of the incident and exiting pencils of rays are indicated by arrows.

FIGS. 2b and 2c show a front and respective rear view and illustrate how the pixel structure of a modulator row as shown in FIG. 2a interacts with the assigned retro-reflective elements RE. The hatched regions indicate the invisible pixels P of the macro-pixel where the reflection of the pencils of rays takes place. The non-hatched regions are the transparent regions with the pixels P through which the pencils of rays enter and through which they exit, respectively.

Figure 3:
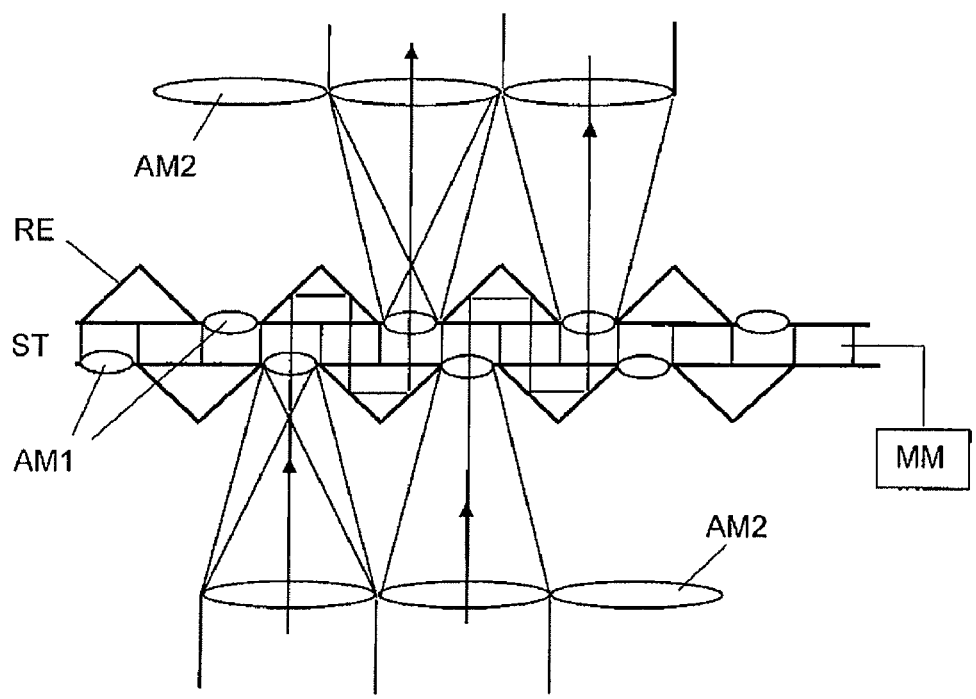

FIG. 3 shows a light modulator device based on the SLM shown in FIG. 2a together with additional components.

An optical imaging means AM1 is disposed in the addressable layer ST with the pixel structure before each pixel column which is hit by an incident pencil of rays or through which a pencil of rays leaves. Further optical imaging means AM2 are disposed on either side of the light modulator. These can for example be cylindrical lenses.

The optical imaging means AM1 and AM2 on the side of light incidence are matched as regards their optical properties such that they collimate the incident pencils of rays and demagnify and image them onto the respective pixel column. On the side of light exit of the SLM, the optical imaging means AM1 and AM2 are matched as regards their optical properties such that they broaden the exiting modulated pencils of rays.

The optical imaging means AM1 can be directly integrated into the substrate layer ST with the pixel structure. Alternatively, the optical imaging means AM2 can be at least partly integrated into the substrate layer ST, according to one physical form of the present invention.

Figure 5:
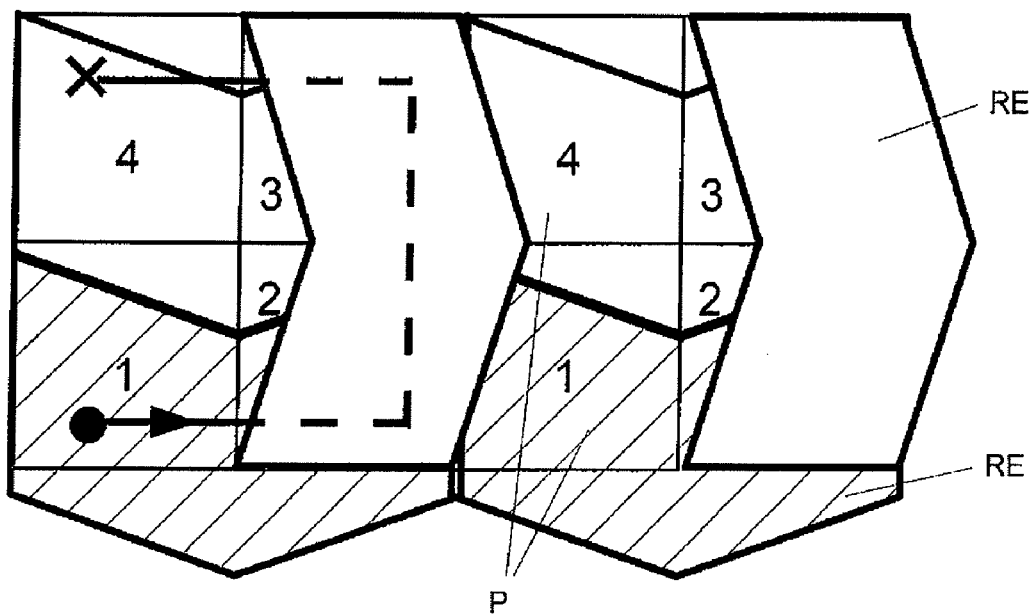
FIG. 5 is another physical form of the first embodiment with a two-dimensional macro-pixel.

Referring to FIG. 5, the pixels can generally be distributed across multiple modulator rows and/or modulator columns such that they form a continuous structure of adjacent pixels as a whole. In this embodiment, two substrate layers are required which are disposed on either side of the addressable transmissive layer and which comprise retro-reflective elements which are arranged side by side but at a certain distance in the two substrate layers. The spaces between neighbouring retro-reflective elements form transparent regions in the substrate layers. The transparent regions concur with the position of the first pixel of a macro-pixel, which is hit by the incident pencils of rays, in the entry-side substrate layer and, respectively, with the position of the last pixel of a macro-pixel in the exit-side substrate layer.

However, the application with a given number of pixels per macro-pixel side by side in a single modulator row or one above another in a single modulator column is preferred, because it is then easier to manufacture the retro-reflective elements.

Further, the reflecting surfaces of the retro-reflective elements in both transmissive substrate layers face the pixels. This preferred arrangement of reflecting surfaces realises a controllable transmissive light modulator in a simple way. The pencils of rays which fall on the macro-pixels leave them at a lateral offset in relation to the direction of light incidence.

Now, the functional principle and possible applications of the controllable spatial light modulator according to this invention will be described in more detail.

A retro-reflector is generally defined as an optical element which reflects incident light back to its source after multiple internal reflections. To achieve this, the retro-reflector has a structure with very small structural units which are arranged one- or two-dimensionally.

In this document, the retro-reflector is represented by a retro-reflective element which comprises two reflective surfaces which are arranged without a gap and which serve as a prismatic element. The arrangement of the retro-reflective elements according to this invention serves to guide the light through a controllable light modulator such that both a reflective and a transmissive type of SLM can be realised.

Referring to FIG. 1, the reflective SLM is illuminated with coherent light. The light beams simultaneously fall on each pixel P in the form of pencils of rays, pass through it and are deflected by the retro-reflective element RE towards the adjacent pixel P of the macro-pixel. Then, they leave the latter with a lateral offset in relation to the direction of light incidence.

Irrespective of whether the pencil of rays first falls on an amplitude-modulating or a phase-modulating pixel P, it always passes through both pixels P of a macro-pixel, so that it is modulated with both an amplitude value and a phase value. The path length within a retro-reflective element RE is always the same, irrespective of the position and angle of light incidence in the respective pixel P. The coherence of the pencils of rays is thus maintained.

When modulating coherent light, different pencils of rays which pass through individual pixels of a light modulator and which are modulated there are known to interfere with each other normally. This corresponds mathematically with a complex-valued addition of the light modulation of the individual pixels P. This also applies in cases where in a normal light modulator groups of pixels are combined logically to form macro-pixels, as in 2-phase encoding methods.

In the reflective light modulator, the retro-reflective elements cause one pencil of rays to pass through several pixels of a macro-pixel sequentially. This corresponds mathematically with a complex-valued multiplication of the light modulation of the individual pixels P of the macro-pixel. The sequential passage through several pixels preferably allows the modulation characteristics of the individual pixels to be combined for one pencil of rays.

Only those pencils of rays which run through different macro-pixels eventually interfere with each other, which again corresponds mathematically with a complex-valued addition of the light modulation of the individual macro-pixels.

Modulation control means MM control the modulation of the pencils of rays in that an individual electric field is applied to each pixel P so to realise a desired amplitude and phase value. The pixels P can have the same general design. In a liquid-crystal-type SLM, a structured polarising means PM which is disposed before the pixels P can for example define for each pixel P whether it modulates the phase or amplitude in that it assigns different polarisations to adjacent pixels P in a modulator row and the same fix polarisation to adjacent pixels P in a modulator column. The thickness of the addressable layer ST for an amplitude-modulating pixel can differ from the thickness of the addressable layer ST for a phase-modulating pixel. Generally, the structure of phase- and amplitude-modulating pixels can be different in other types of SLM.

A system controller controls the liquid crystals in the addressable layer ST such to achieve simultaneous orientation, where the modulation control means MM are a part of said system controller.

In a liquid-crystal-type SLM, the pixels P can also be configured for amplitude and phase modulation, respectively, by a spatially structured polarising means PM in combination with different alignment layers in the SLM. Further, the pixels P can also be configured only by using different alignment layers, so that the liquid crystals in an amplitude-modulating pixel are oriented differently than those in a phase-modulating pixel.

In the other embodiments of reflective SLM, the two possible directions in which the macro-pixel can be passed through by the pencils of rays must be taken into consideration. Referring to FIG. 1, a pencil of rays could either first pass through the left pixel P, which is denoted with the letter A, of a macro-pixel, then be reflected by the retro-reflective element RE, and eventually pass through the right pixel P, which is denoted with the letter φ, of the macro-pixel; or, vice versa, another pencil of rays could first pass through the pixel φ, then be reflected by the retro-reflective element RE, and eventually pass though pixel A. It must be noted in this respect that the total modulation in the macro-pixel is controlled independently of the direction of passage of the pencils of rays.

In liquid-crystal-type SLMs, this can be achieved for example by introducing additional polarising means between addressable layer ST and substrate layer SR. Alternatively, a structured polarising means is used to generate polarised light which blocks one of the two directions, such that for example the incidence of light into the pixel φ as the first pixel is prevented. However, this goes along with a loss of brightness.

Instead of the modulation of amplitude and phase in two pixels P of the macro-pixel as described above, it is also possible to use more pixels P, each of which modulating both amplitude and phase, but which—seen as individual pixels—do not allow arbitrary combinations of amplitude and phase. With a macro-pixel which comprises several such pixels P which are sequentially passed through by a pencil of rays, all those combinations of amplitude and phase values can be realised which result from the complex-valued multiplication of the modulation of the individual pixels. The different combinations of the modulation of the individual pixels are set by the modulation control means. Individual pixels of same design can preferably be used for this. This simplifies the manufacturing process of the addressable layer of the SLM, because then all individual pixels are made the same way.

An SLM of such design modulates with simple means coherent pencils of rays on their way to detected observer eyes e.g. with complex values of a moving scene which is to be represented holographically. This design has the advantage that it is mainly the substrate layers of a conventional pixelated flat display panel that need to be modified and that no further substantial modifications must be made. Another advantage is that the SLM is able to cope with oblique angles of light incidence, because the retro-reflective elements transmit the pencil of rays sequentially through the individual pixels of the macro-pixel, irrespective of their angle of incidence.

The embodiment of a reflective light modulator with two substrate layers which are disposed on either side of the pixel structure is illustrated in FIGS. 4 and 5. The light entry side of the light modulator is also the light exit side. Both Figures differ in the position of the retro-reflective elements RE in the substrate layers SR and in the form of the macro-pixels. Each macro-pixel comprises four pixels P.

Referring to FIG. 4, the pencils of rays are guided through the macro-pixels one-dimensionally. After entry into the first pixel P of the macro-pixel, the pencils of rays are reflected by three vertically arranged retro-reflective elements RE, whereby they sequentially pass through the subsequent pixels P where they are modulated with the corresponding modulation characteristic of those pixels P. After passage through the fourth pixel P, the pencils of rays leave the structure with a lateral offset in relation to the direction of light incidence. To realise this optical path, the substrate layer SR on the light entry side comprises a retro-reflective element RE before every second and third pixel P of a macro-pixel. The transparent regions are situated before every first and fourth pixel P.

The retro-reflective elements RE are disposed one after another without gaps in the substrate layer SR behind the addressable layer ST.

Referring to FIG. 5, the pencils of rays are guided through the macro-pixels two-dimensionally. In such an arrangement, two horizontally and two vertically adjacent pixels P are addressed as one macro-pixel. The retro-reflective elements RE on the light entry side of the light modulator are disposed one after another vertically without gaps. Horizontally, they exhibit a gap with the width of one pixel P. This way, the light entry side of the light modulator exhibits vertical stripes of retro-reflective elements RE and vertical stripes of transparent regions in alternating arrangement.

In the substrate layer behind the pixels P, the retro-reflective elements RE are disposed without gap in the vertical direction in accordance with the row structure of the SLM panel, so that altogether a reflective arrangement is realised for the incident pencils of rays.

The light falls on the first pixel P at a right angle to the drawing plane, which is indicated by a black dot. The pixels P of the macro-pixel are numbered 1-4. They are passed throughby the pencils of rays sequentially in this order after multiple reflections. The optical path is indicated by a line in the drawing, which is represented partly broken. The pencils of rays leave the macro-pixel after having been modulated by the different or identical modulation characteristics of the individual pixels P with a horizontal offset in relation to the direction of light incidence. The point of light exit is marked with a cross.

Now, if a light beam passes through several pixels P of the same macro-pixel one after another, the total modulation mathematically corresponds with the multiplication of the light modulation of these pixels P as set by the modulation control means.

The basic components of FIGS. 2 and 3 are combined in these embodiments such that a transmissive spatial light modulator can be realised in a transmissive light modulator device.

In the light modulator according to FIG. 2, the retro-reflective elements RE in the substrate layers ST are disposed on either side of the pixel structure. Further, the individual retro-reflective elements RE are disposed in the substrate layer SR separated by gaps of the width of one pixel P. The retro-reflective elements RE are disposed in opposition and with an offset of one pixel P, and their reflective surfaces face the pixels P.

A pencil of rays which falls on the first pixel P of the macro-pixel passes through the two subsequent pixels P after having been reflected by two retro-reflective elements RE and leaves the macro-pixel in the same direction. While it passes through this arrangement, the pencil of rays is modulated with the modulation characteristics of the individual pixels P as defined by the system controller and controlled by modulation control means MM.

In the case that a liquid-crystal-type SLM is used, a polarising means PM can be disposed on either side on the outside of the substrate layers SR, where said means determines the type of modulation of the pixels P (phase and/or amplitude) in analogy with was said for the first embodiment.

In addition, structured polarising means PM can be disposed on the respective insides of the substrate layers SR between the addressable layer ST and the retro-reflective element RE. They serve to modify the polarisation of the pencils of rays after they have passed through one pixel P of the macro-pixel and before they pass through the next pixel P of the macro-pixel.

Here, in addition to the larger number of pixels P for representing complex values, an advantage is that, in contrast to the embodiments of reflective SLMs, the pencils of rays pass through the number of pixels P, which is three in this example, in a fixed order. Thanks to the defined optical path, the arrangement of pixels for amplitude and/or phase modulation can be optimised.

The three pixels P of the macro-pixel can be used in different ways for representing a complex value. In a light modulator with liquid crystal layers, in the case of a zero-twisted nematic or ECB LC mode, the layers can for example only differ in the polarisation directions and in the required thickness of the layers for a phase-only modulation up to $2*\pi$ and for an amplitude-only modulation.

In contrast, if the pixels of the transmissive SLM shall be used for a combined amplitude and phase modulation, it is for example possible to have two pixels P modulating a phase up to $1*\pi$, and one pixel P modulating an amplitude as controlled by the modulation control means. The liquid crystal layer can then preferably have the same thickness for all three pixels. However, the polarisation of the light must then be turned by 45° relative to the orientation of the liquid crystals between the phase-modulating pixels and the amplitude-modulating pixels.

This is achieved as described above in that a structured polarising means is disposed on the inside of the substrate layer between addressable layer and retro-reflective element. Then, if for example the phase is modulated first, the pencil of rays is re-polarised after having passed through the second phase pixel and before it passes through the third pixel.

Alternatively, the pixels P can also be configured only by using different alignment layers, so that the liquid crystals in the amplitude-modulating pixel are oriented such that they are turned by 45°. In this case, the polarisation of the light can be maintained.

Generally, other combinations of modulation characteristics of the three pixels of the macro-pixel are possible in order to modulate incident pencils of rays with a complex value.

A light modulator of the transmissive type can be supplemented with additional components as shown in FIG. 3. Since the macro-pixel functions as one uniform pixel which has a small fill factor, a combination with optical imaging means AM1 and AM2 makes sense in order to improve the fill factor of the light modulator.

The optical imaging means AM1 and AM2 on the light entry side of the light modulator which are matched as regards their imaging characteristics ensure the incident pencils of rays which fall on the pixels P to be demagnified and imaged onto the transparent regions of the macro-pixels.

On the light exit side, the optical imaging means AM1 and AM2 are matched such that the pencils of rays of the modulated light beams are broadened uniformly. Since the pencils of rays have passed through all pixels P of the macro-pixel sequentially, so that they are already homogeneous, the entire SLM is illuminated homogeneously too.

The light modulator can further be used such that the assigned modulation characteristic can realise a total modulation of complex numbers which differs from the complex or coupled amplitude and phase modulation. This also includes a phase-only or an amplitude-only modulation.

For example, always one macro-pixel can perform an amplitude-only modulation of the light so that by combining the amplitude-modulating pixels of the macro-pixel the contrast of the modulation of the macro-pixel is improved compared with the contrast of the modulation of a single pixel.

However, one macro-pixel can also perform a phase-only modulation, where one single pixel is controlled with the two phase values 0 and $\pi$ only, while a second pixel is controlled with the two phase values 0 and $\pi/2$ only. The sequential passage of the pencil of rays through the two pixels allows four different phase values to be achieved, namely 0, $\pi/2$, $\pi$ and $3\pi/2$, which is a doubling of the number of quantisation steps.

This principle can also be applied to a larger number of pixels per macro-pixel; and the number of quantisation steps can also be increased analogously for amplitude-modulating light modulators.

The increase in the number of quantisation steps preferably allows certain types of fast SLMs, such as ferroelectric LC panels, to be used in applications such as holographic displays, for which conventional models of those SLM types would be unsuitable because they only have two quantisation steps.

Several amplitude- or phase-modulating pixels can be disposed one behind another to form a large macro-pixel of likewise combined amplitude-only modulating or phase-only modulating pixels. When doing so, the quantisation steps for amplitude and phase can be chosen independent of one another and in accordance with the number of amplitude-only modulating and phase-only modulating pixels in the macro-pixel.

One of the light modulators described above, to which a diffracting structure of a wave front of a spatial scene is written, where said structure serves to modulate the incident pencils of rays so to create a holographic reconstruction, can be used in a holographic display device.

The holographic display device can be of a reflective or transmissive type, depending on which type of SLM according to this invention is actually used.

The invention claimed is:

1. Controllable light modulator with at least one addressable transmissive layer and at least one substrate layer, where the addressable transmissive layer has pixels which are regularly arranged in modulator columns and/or modulator rows, and where the substrate layer has retro-reflective elements with reflective surfaces for guiding light of incident pencils of rays, and with a system controller with modulation control means for controlling the modulation of the pixels, wherein The modulation control means generate a number of macro-pixels of at least two pixels which are arranged next to each other in a modulator row and/or modulator column and which are assigned by the system controller with a selected modulation characteristic, and that The retro-reflective elements are arranged side by side in the substrate layer in a plane which is parallel to the plane of the light modulator such that each retro-reflective element covers two adjacent pixels of a macro-pixel in a modulator row or modulator column of the addressable layer in order to direct a pencil of rays which falls on one pixel of a macro-pixel after reflection from at least one retro-reflective element sequentially through at least one further pixel of the macro-pixel in order to modulate the incident pencils of rays.

2. Controllable light modulator according to claim 1, wherein on either side of the addressable layer there is a substrate layer with retro-reflective elements which are disposed such that transparent regions are created between adjacent retro-reflective elements in at least one substrate layer and that the reflective surfaces of opposing retro-reflective elements face the pixels of the addressable transmissive layer and are arranged at a lateral offset to each other.

3. Controllable light modulator according to claim 2, which is designed as a transmissive light modulator with light being guided through a macro-pixel with an odd number of pixels and over at least two retro-reflective elements, where the transparent regions of the one substrate layer represent the entry surfaces for the pencils of rays, and where the other substrate layer also has transparent regions which represent the exit surfaces for the pencils of rays.

4. Controllable light modulator according to claim 3, wherein optical imaging means are provided in the transparent regions on the side of light incidence which demagnify and image the incident pencils of rays onto the entry surfaces of the macro-pixels or wherein optical imaging means are provided in the transparent regions on the side of light exit which broaden the pencils of rays which have passed through the macro-pixels.

5. Controllable light modulator according to claim 4, wherein the optical imaging means are cylindrical lenses which are arranged in an array.

6. Controllable light modulator according to claim 4, wherein the optical imaging means are at least partly integrated into the addressable layer.

7. Controllable light modulator according to claim 2, which is designed as a transmissive light modulator with light being guided through a macro-pixel with an even number of pixels and over at least three retro-reflective elements, where transparent regions in one substrate layer represent the entry surfaces of the pencils of rays, and where other transparent regions in the same substrate layer represent the exit surfaces of the pencils of rays.

8. Controllable light modulator according to claim 7, wherein a polarising means is disposed on either side of the light modulator, said polarising means having a structure which polarises the pencils of rays differently in the transparent regions of the entry surfaces and in the transparent regions of the exit surfaces.

9. Controllable light modulator according to claim 2, wherein a polarising means is disposed on at least one side of the light modulator.

10. Controllable light modulator according to claim 2, which is designed as a reflective light modulator with a single addressable transmissive layer and a single substrate layer, which follows in the direction of light propagation, where the retro-reflective elements are disposed in the substrate layer in a plane which is parallel to the plane of the light modulator vertically without gaps.

11. Controllable light modulator according to claim 10, wherein the pencil of rays which falls on one pixel of the macro-pixel passes the macro-pixel and leaves it with a lateral offset to the position of incidence independent of the position and angle of incidence on the pixel.

12. Controllable light modulator according to claim 10, wherein a polarising means which is structured in columns is disposed before the transmissive substrate layer in the direction of light propagation, said polarising means assigning different polarisations to the two pixels of the macro-pixel.

13. Controllable light modulator according to claim 10, wherein the path lengths covered by the incident pencil of rays within the macro-pixel are about in the magnitude of the pixel pitch of the light modulator.

14. Controllable light modulator according to claim 2, wherein a complex-valued modulation of a pencil of rays is performed in each macro-pixel, i.e. a modulation of both amplitude and phase.

15. Controllable light modulator according to claim 14, wherein a combined amplitude and phase modulation of the pencil of rays is achieved in a macro-pixel of three pixels in that two pixels are controlled such to perform a phase modulation while one pixel is controlled such to perform an amplitude modulation.

16. Controllable light modulator according to claim 14, wherein each single pixel of the macro-pixel has a different modulation characteristic and is controlled individually such that a pencil of rays is given an independent modulation of amplitude and phase during the passage through the macro-pixel, thanks to the combination of the modulation characteristics.

17. Controllable light modulator according to claim 2, wherein the pixels of the macro-pixel have the same modulation characteristic and are controlled such that a pencil of rays is given an independent modulation of amplitude and phase during the passage through the macro-pixel, thanks to the combination of the modulation characteristics.

18. Controllable light modulator according to claim 2, wherein the number of represented quantisation steps of the modulation increases as the number of pixels in the macro-pixel becomes larger.

* * * * *